(12) United States Patent
Abe

(10) Patent No.: US 6,201,781 B1
(45) Date of Patent: Mar. 13, 2001

(54) DISC PLAYER

(75) Inventor: Hiroshi Abe, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 09/365,218

(22) Filed: Jul. 30, 1999

(30) Foreign Application Priority Data

Jul. 31, 1998 (JP) .................................................. 10-217676

(51) Int. Cl.⁷ ............................ G11B 17/04; G11B 33/02
(52) U.S. Cl. .......................... 369/263; 369/247; 369/77.1
(58) Field of Search .................................. 369/263, 77.1, 369/75.2, 247, 75.1

(56) References Cited

U.S. PATENT DOCUMENTS

| | | |
|---|---|---|
| 4,628,498 | 12/1986 | Takamatsu et al. . |
| 4,764,917 * | 8/1988 | Sugihara et al. ..................... 369/77.1 |
| 5,226,028 * | 7/1993 | Yamada et al. ..................... 369/77.1 |
| 5,602,818 | 2/1997 | Kage et al. . |
| 5,636,198 * | 6/1997 | Maeng ................................. 369/191 |

* cited by examiner

Primary Examiner—William Klimowicz
(74) Attorney, Agent, or Firm—Brinks Hofer Gilson & Lione

(57) ABSTRACT

A miniaturized locking mechanism for selectively placing a drive unit in a locked or unlocked state. A locking mechanism in which a drive unit 1 is movably supported on a chassis 3 through a resilient member to selectively place the drive unit 1 in a locked or unlocked state, wherein a roller bracket 9, an arm member 17 and a slide member 18 are mounted on the chassis 3. The slide member 18 moves in a longitudinal direction of the chassis 3 in association with the rotation of the arm member 17 and having an engaging groove 18d which can be engaged with and disengaged from a protrusion 1a of the drive unit 1. The roller bracket 9 rotates in a direction of moving a drive roller 10 away from a disc D when the disc D is mounted, and a first cam groove 17a and a second cam groove 18b, in which traces a drive pin 20 provided on the roller bracket 9, are put in the arm member 17 and the slide member 18, whereby when locked, the drive pin 20 is placed in engagement with the second cam groove 18b, while when unlocked, the drive pin 20 is placed in engagement with the first cam groove 17a.

10 Claims, 3 Drawing Sheets

DISC PLAYER

BACKGROUND OF THE INVENTION

1. Field of the Invention

The present invention relates to a disc player such as a CD player, a CD-ROM player or the like for vehicles, and particularly to a locking mechanism for selectively enabling a vibration-proof construction for resiliently supporting a drive unit on a chassis in a locked or unlocked state.

2. Description of the Prior Art

Generally, the CD player for vehicles has a vibration-proof construction for movably supporting a drive unit having a pickup, a turn-table or the like loaded thereon on the chassis through a resilient member, and is designed so that when operating in a reproduction state, the disc is not disturbed by external vibrations. In this case, when the drive unit is resiliently supported while carrying the disc, if the drive unit is moved by the external vibrations, the disc being carried may collide with the drive unit and be damaged. So, a locking mechanism has been employed in which when the disc is not mounted on the drive unit, the vibration-proof construction is placed in a locked state, and the drive unit is fixedly supported on the chassis (an example of which is disclosed in U.S. Pat. No. 4,628,498).

The locking mechanism for the disc player described in the aforementioned patent is provided with a rotatable roller bracket having a drive pin, a rotatable arm member having a cam surface, and a slide member capable of being moved forward and backward having an engaging groove; the roller bracket, the arm member and the slide member being mounted on the side plate of the chassis which resiliently supports a drive unit. A drive roller for carrying a disc is supported on the roller bracket, and the roller bracket rotates when the disc is carried onto the turn-table of the drive unit to move the drive roller away from the disc. The drive pin provided on the roller bracket is in contact with the cam surface of the arm member, and the arm member is rotated in association with the rotation of the roller bracket. The arm member is connected with the slide member through a protrusion and a slot, and when the arm member rotates, the protrusion of the arm member moves within the slot of the slide member whereby the slide member moves in a longitudinal direction. The engaging groove provided in the slide member is opposed to the protrusion provided on the drive unit, and when the slide member moves in a longitudinal direction, the engaging groove is engaged with or disengaged from the protrusion.

In the locking mechanism described above, when the disc is not mounted on the drive unit, the engaging groove of the slide member is engaged with the protrusion of the drive unit at the background position, and the drive unit assumes a locked state in which the former is fixedly supported on the chassis. When the disc is mounted in the locked state, the disc is carried onto the turn-table of the drive unit by the drive roller, but since at that time the drive unit is fixedly supported on the chassis, the disc is prevented from colliding with the drive unit. When the disc is carried onto the turn-table, the roller bracket rotates to move the drive roller away from the disc, and the drive pin moves along the cam surface of the arm member whereby to rotate the arm member, in association with which the slide member is moved from the backward position to the forward position. As a result, the engaging groove of the slide member is moved away from the protrusion of the drive unit to assume an unlocked state so that the drive unit is resiliently supported on the chassis along with the disc, thus preventing the reproduction state of the disc from being disturbed by external vibration.

The aforementioned conventional locking mechanism poses a problem that since the arm member and the slide member are mounted on the side plate of the chassis in an overlapping manner, when the rotational motion of the arm member is converted into the linear motion of the slide member, the arm member and the slide member rub against each other to impede smooth operation. So, it is contemplated that the arm member and the slide member are arranged within one and the same plane along the side plate of the chassis. However, since the cam surface formed on the arm member and the drive pin of the roller bracket should always be placed in contact with each other, it is difficult to miniaturize the arm member, and as a consequence, the entire disc player is prevented from being formed in a thinner configuration.

In accordance with the present invention, cam portions in which a drive pin of a roller bracket traces are put in an arm member and a slide member whereby when the drive unit is locked, the cam portions are brought into communication with each other, and when the drive unit is unlocked, the cam portions are separated from each other. With this construction, a part of the full length required for the cam portions is borne by the slide member, and therefore, miniaturization of the arm member itself and the rotational area thereof is possible so that the entire disc player can be formed in a thinner configuration; and further, when the drive unit is locked, the drive pin engages with the cam portion on the slide member side, thus enhancing the locking force.

SUMMARY OF THE INVENTION

In accordance with the present invention, there is provided a disc player comprising: a drive unit movably supported on a chassis through a resilient member, a drive roller for carrying a disc in and out of the drive unit, a roller bracket for rotatably supporting the drive roller, an arm member rotated by the roller bracket, and a slide member movable in a longitudinal direction of the chassis by the arm member and having a locking portion for impeding the movement of the drive unit, the disc player constituted in that the arm member and the slide member are respectively provided with a cam portion, an engaging portion provided on the roller bracket is arranged movably in the cam portion, and when the movement of the drive unit is impeded, the cam portions communicate with each other and the engaging portion is positioned on one of the arm member and the slide member, whereas when the drive unit can be moved, the cam portions are separated from each other and the engaging portion is positioned on the other of the arm member and the slide member.

Further in accordance with the present invention, there is provided a locking mechanism for a disc player for vehicles comprising: a drive unit movably supported on a chassis through a resilient member, a drive roller for carrying a disc in and out of the drive unit, a rotatable roller bracket for moving the drive roller from the disk when the disk is mounted, an arm member rotated by the rotation of a drive pin provided on the roller bracket, and a slide member movable in a longitudinal direction of the chassis in association with the rotation of the arm member, wherein when the slide member is engaged with the drive unit, the movement of the drive unit is impeded to assume a locked state whereas when the engagement between the slide member and the drive unit is released, an unlocked state is assumed where the drive unit is movable, the locking mechanism being constituted in that the arm member and the slide member are respectively provided with a cam portion whereby when the drive unit is in a locked state, the cam portions are brought into communication with each other and the drive pin is brought into engagement with the cam portion on the slide member side, whereas when the drive unit is in an unlocked state, the cam portions are separated from each other, and the drive pin is brought into engagement with the cam portion on the arm member side.

With this construction, a part of the full length required for the cam portions is borne by the slide member, and therefore, miniaturization of the arm member itself and the rotational area thereof is possible so that the entire disc player can be formed in a thinner configuration; and further, when the drive unit is locked, the drive pin engages with the cam portion on the slide member side, thus enhancing the locking force.

Further, if when the drive unit shifts from the unlocked state to the locked state, the slide member moves from the backward position to the forward position of the chassis relative to the drive unit, in the case where the disk player is installed longitudinally, the empty weight of the drive unit acts, when locked, in a direction of enhancing the locking force, because of which it is possible to prevent inferior operation in which in the state of being locked, the locked state is easily released, for example, by vibration from outside.

DESCRIPTION OF THE PREFERRED EMBODIMENT

One embodiment of a disc player according to the present invention will be described hereinafter with reference to the accompanying drawings.

Figure 1:
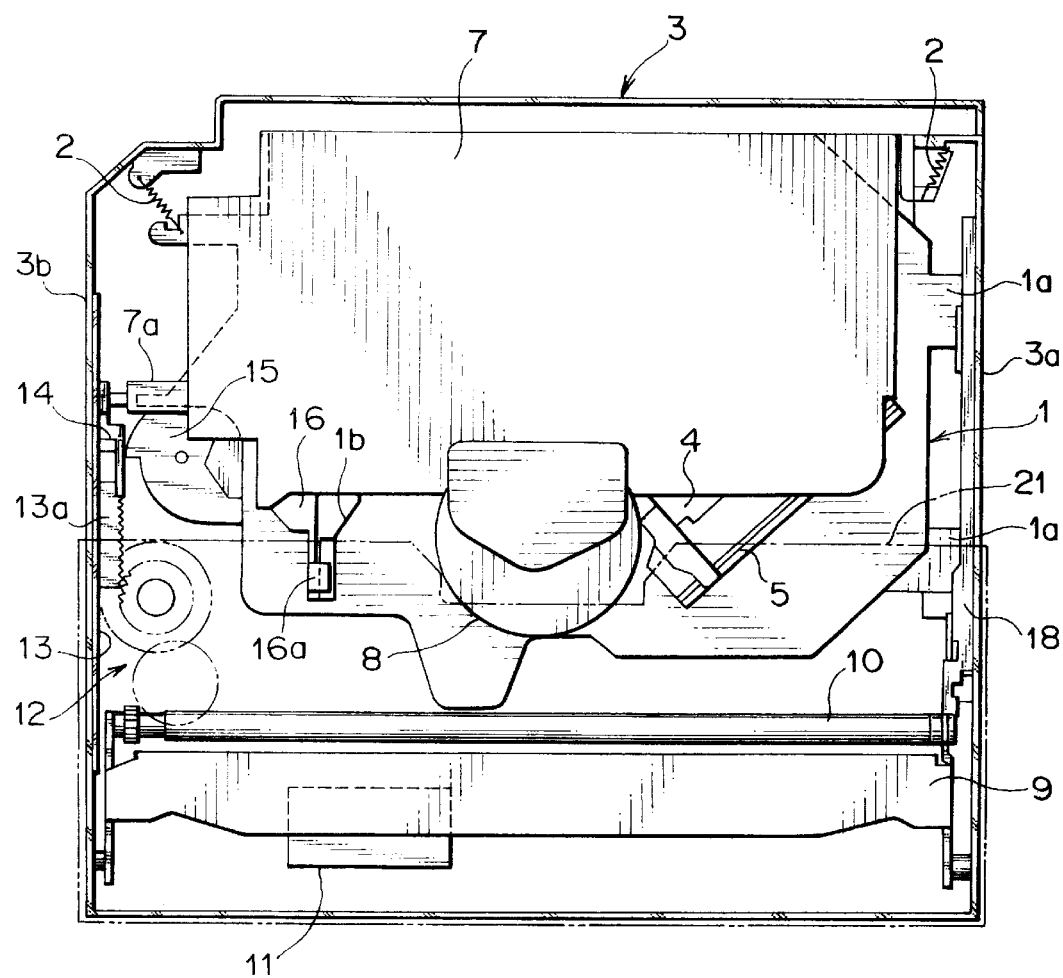
FIG. 1 is a plan view of a disc player for vehicles according to one embodiment of the present invention.
Figure 1:
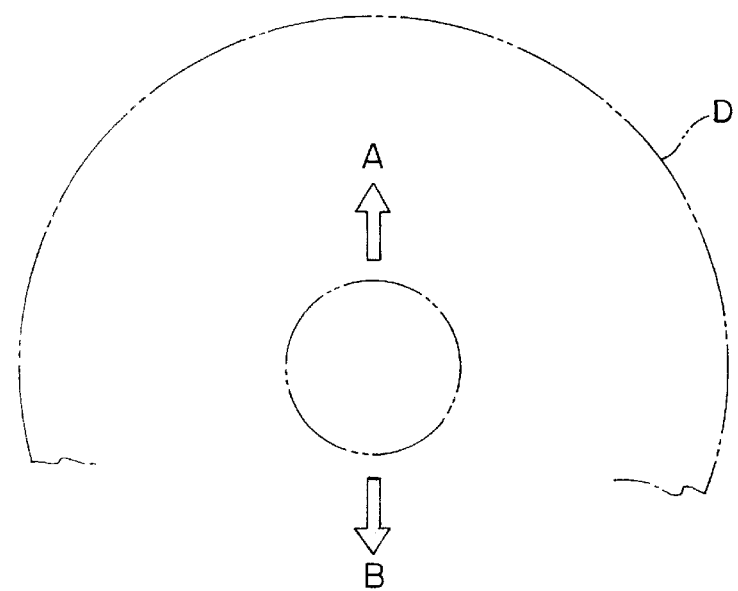
Figure 2:
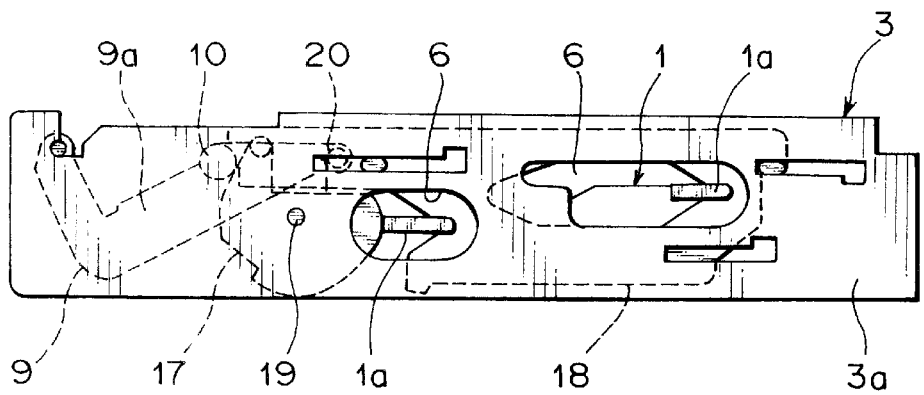
FIG. 2 is a side view of the disc player shown in FIG. 1 as viewed from the right side of a chassis.

Referring to FIG. 1, a drive unit indicated by reference numeral 1 is supported in a vibration proof manner on a chassis 3 through resilient members comprising a plurality of coil springs 2 or an oil damper with silicon oil sealed Wherein (not shown), so that the drive unit 1 can be moved through a distance permitted by the resilient members. On the drive unit 1 are loaded a turn-table for rotating a disc D, a spindle motor as a drive source for the turn-table (which are not shown), an optical pickup 4 for reading an information signal from the disc D, and so on, the optical pickup 4 being guided by a drive shaft 5 and moved in a radial direction of the disc D. Integrally formed on the right-hand end of the drive unit 1 (as shown in FIG. 1) are a pair of protrusions 1a, which extend into through-holes 6 formed in a right-hand plate 3a of the chassis 3, as shown in FIG. 2. A clamp arm 7 is rotatably supported on the rear end of the drive unit 1, and a clamper 8 is rotatably supported, at a position opposite to the turn-table, on the clamp arm 7. The clamp arm 7 is always biased in a direction close to the drive unit 1 by means of a coil spring not shown, but when the disc D is not mounted on the turn-table, the clamp arm 7 is controlled to be moved away from the drive unit 1 and placed on alert at an upper position.

A roller bracket 9 is rotatably supported on the right-hand plate 3a and a left-hand plate 3b of the chassis 3, and both ends of a drive roller 10 are rotatably supported on the roller bracket 9. The drive roller 10 can be rotated in both normal and reverse directions by a motor 11 as a drive source arranged on the bottom surface of the chassis 3, and the turning force of the motor 11 is transmitted to the drive roller 10 through a reduction gear train 12. A drive plate 13 and a switching lever 14 are mounted on the left-hand plate 3b of the chassis 3. Although not shown, a cam hole provided in the drive plate 13 engages with a pin provided on the left end of the roller bracket 9. The switching lever 14 is rotated by a trigger lever 7a provided on the clamp arm 7, and a rack 13a provided on the drive plate 13 is selectively meshed with the reduction gear train 12 by means of the switching lever 14. When the rack 13a meshes with the reduction gear train 12, the drive plate 13 is moved forward by the turning force of the motor 11 so that the roller bracket 9 in engagement with the cam hole of the drive plate 13 rotates. Further, a rotating arm 15 is meshed with a separate rack (not shown) provided at the rear end of the drive plate 13, the rotating arm 15 being rotated by the forward and backward movement of the drive plate 13. The rotating arm 15 engages with a lock plate 16 arranged under the drive unit 1, the lock plate 16 being formed with a lock portion 16a which can be engaged with and disengaged from the lock hole 1b provided in the drive unit 1, and formed with a control portion (not shown) for causing the clamp arm 7 to await at an away position of the drive unit 1.

Figure 3:
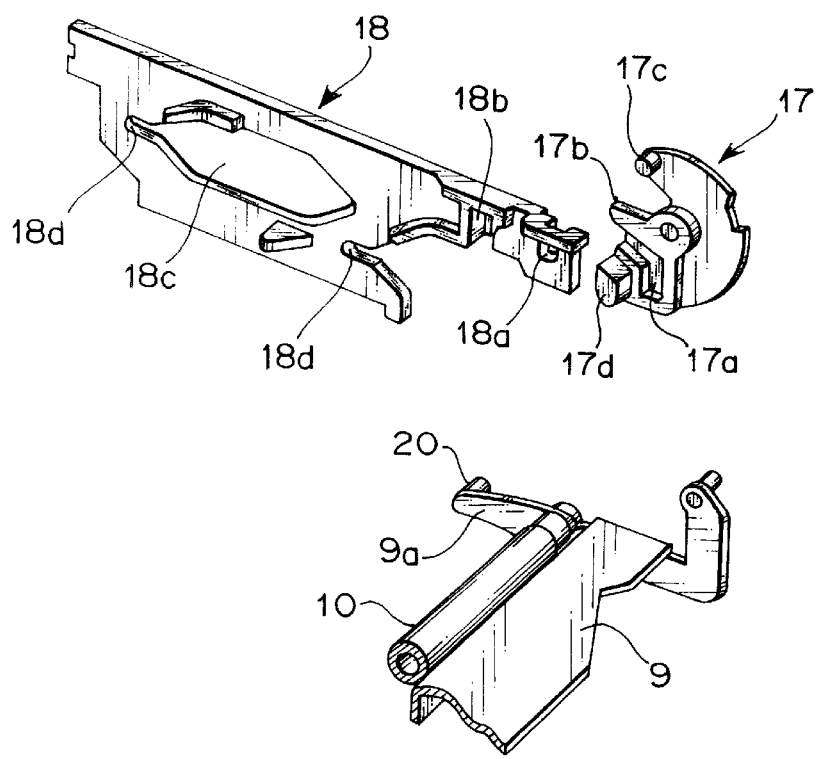
FIG. 3 is an exploded perspective view of a locking mechanism provided on the disc player according to the invention.

On the other hand, as shown in FIG. 2, an arm member 17 and a slide member 18 are mounted on the right-hand plate 3a of the chassis 3, and the arm member 17, the slide member 18 and the roller bracket 9 constitute a lock mechanism. The arm member 17 is rotatably supported on the right-hand plate 3a of the chassis 3 by a support shaft 19, while the slide member 18 is supported capable of being moved forward and backward on the right-hand plate 3a of the chassis 3 by a plurality of guide holes. As shown in FIG. 3, an arm portion 9a is formed on the right-hand end of the roller bracket 9, and a drive pin 20 is provided on the extreme end of the arm portion 9a. The drive pin 20 can be engaged with and disengaged from a first cam groove 17a formed in the arm member 17, and a protrusion 17b is formed in the vicinity of an open end of the first cam groove 17a. Further, the arm member 17 is formed with a connecting pin 17c and a stopper portion 17d, the stopper portion 17d having a function of coming into contact with the bottom surface of the chassis 3 to prevent the arm member 17 from being excessively rotated. The connecting pin 17c of the arm member 17 is in engagement with a slot 18a formed in the slide member 18. The connecting pin 17c moves vertically within the slot 18a whereby the rotational motion of the arm member 17 is converted into the linear motion of the slide member 18. The slide member 18 is formed with a second cam groove 18b for opening the lower end of the slide member 18 and an escape hole 18c. The escape hole 18c is formed at the front end and the rear end thereof to receive a protrusion 1a of the drive unit 1 and an engageable and disengageable engaging groove 18d, respectively. The lower end of the second cam groove 18b is selectively communicated with the open end of the first cam groove 17a according to the rotating condition of the arm member 17. The drive pin 20 moves within the first and second cam grooves 17a and 18b.

As shown in FIG. 1, integrated on the upper end of the chassis 3 is a top chassis 21 shown in broken lines. A disc guide plate (not shown) formed of a highly sliding resin or the like is mounted on the back of the top chassis 21. The disc D is carried in the direction of arrow A or arrow B in FIG. 1 when the disc D is held between the disc guide plate and the drive roller 10.

Figure 4:
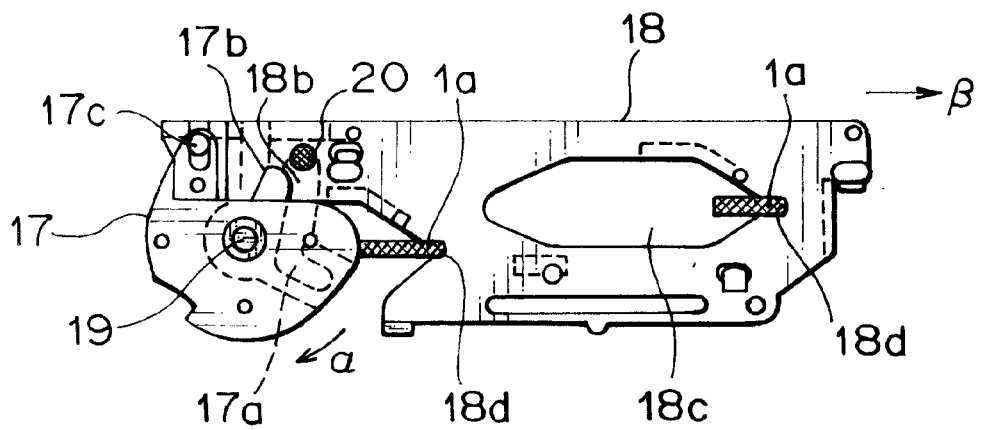
FIGS. 4(a) and 4(b) are additional views for explaining the operation of the locking mechanism.
Figure 4:
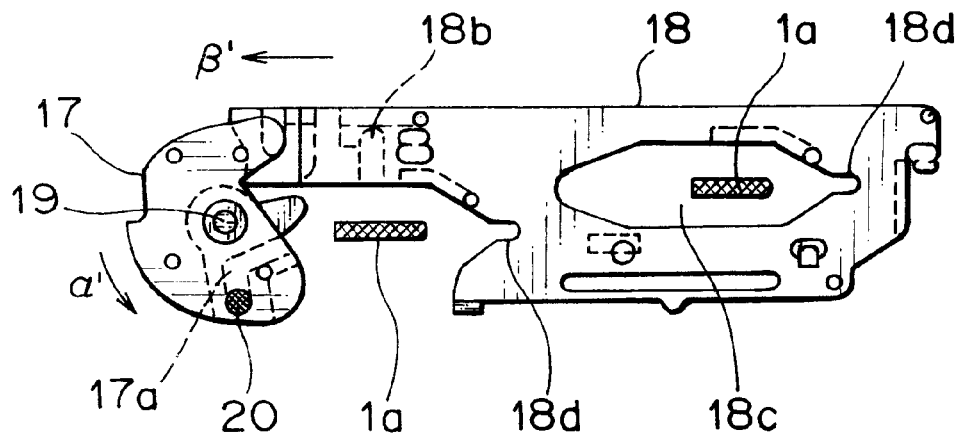

Out of the operation of the disc player for vehicles constructed as described above, the operation of the lock mechanism will be mainly explained below with reference to FIG. 4.

First, at the time of insertion in which the disc D is not loaded in the disc player, as shown in FIG. 4(a), the drive pin 20 provided on the roller bracket 9 is in the upper position and engages with the second cam groove 18b of the slide member 18, and the slide member 18 is stopped at the position of forward movement by the drive pin 20. In this case, the first cam groove 17a of the arm member 17 and the second cam groove 18b of the slide member 18 are in communication at their mutual open ends. The protrusion 17b of the arm member 17 overlaps with the slide member 18 in the direction of plate-thickness to prevent the drive pin 20 from slipping out. An engaging groove 18d of the slide member 18 engages with one end of a protrusion 1a, and the other protrusion 1a comes in contact with the arm member 17 to impede the movement of the drive unit 1, the drive unit 1 being a locked state in which the former is fixedly supported on the chassis 3. In this locked state, the lock portion 16a of the lock plate 16 also engages with the lock hole 1b of the drive unit 1, and the clamp arm 7 stands by in the state positioned upwardly away from the drive unit 1.

When the disc D is loaded on the disc player, the motor 11 is rotated in one direction by a detection switch (not shown), and its turning force is transmitted to the drive roller 10 through the reduction gear train 12 whereby the disc D is carried in direction of arrow A in FIG. 1 while being held between the disc guide plate of the top chassis 21 and the drive roller 10. During that period, the roller bracket 9 is positioned upwardly to maintain the engagement between the drive pin 20 and the second cam groove 18b, thereby preventing the disc D from colliding with the drive unit 1 in the locked state.

When the center of the disc D is carried to a position immediately over the turn-table of the drive unit 1, the trigger lever 7a provided on the clamp arm 7 causes the switching lever 14 to rotate so that the rack 13a of the drive plate 13 meshes with the reduction gear train 12, and therefore the drive plate 13 moves forward to rotate the roller bracket 9 from an upper position to a lower position. This rotation of the roller bracket 9 causes both the drive roller 10 and the drive pin 20 to move downward, and the drive roller 10 moves down to an evacuated position so that it cannot contact the lower surface of the disc D. The drive pin 20 moves from the second cam groove 18b of the slide member 18 to the first cam groove 17a of the arm member 17 in communication therewith, and the arm member 17 starts to rotate in the direction of arrow α in FIG. 4(a). When the arm member 17 rotates in the direction of arrow α as described, its rotating motion is converted into the linear motion of the slide member 18 by the engagement between the connecting pin 17c and the slot 18a, and therefore the slide member 18 moves in the direction of arrow β in FIG. 4(a), that is, from the forward position to the backward position so that the engaging groove 18d of the slide member 18 is disengaged from the protrusion 1a of the drive unit 1. As a consequence, the locked state between the engaging groove 18d and the protrusion 1a is released into an unlocked state whereby the drive unit 1 is resiliently supported on the chassis 3 by means of the coil springs 2 or the like.

The rotating arm 15 is rotated by the advancing drive plate 13 in association with the switching operation of the lock mechanism to move the lock plate 16 backward in FIG. 1. With this, the lock portion 16a of the lock plate 16 is disengaged from the lock hole 1b of the drive unit 1, and the control of the clamp arm 7 is released whereby the damper 8 is pressed against the turn-table of the drive unit 1 through the center portion of the disc D. Accordingly, the disc D is in an unlocked state, and an information signal is read by the optical pickup 4 to prevent the reproduction state of the disc D form being disturbed by external vibrations.

Further, when the disc D is ejected from the drive unit 1, the above operation is carried out in reverse. As the roller bracket 9 moves up, the arm member 17 starts to rotate in the direction of arrow α' in FIG. 4(b) to move the slide member 18 in the direction of arrow β' in FIG. 4(b), that is, from the backward position to the forward position, after which it returns to the locked state shown in FIG. 4(a). In this locked state, the open ends of both the cam grooves 17a and 18b communicate with each other, the drive pin 20 moves to the second cam groove 18b, and therefore the drive unit 1 is again fixedly supported on the chassis 3.

In the embodiment constructed as described above, the drive pin 20 of the roller bracket 9 traces within the second cam groove 18b provided in the slide member 18 and the first cam groove 17a provided in the arm member 17 between the locked state and the unlocked state of the drive unit 1. Therefore, a part of the full length required in the cam portion is borne by the slide member 18, so that the arm member 17 itself and its rotation area can be minimized and the entire disc player can be formed in a thinner configuration. Further, since in the locked state of the drive unit 1 the drive pin 20 engages with the second cam groove 18b of the slide member 18, the locking force of the slide member 18 can be enhanced. Further, when the drive unit 1 shifts from the unlocked state to the locked state, the slide member 18 moves from the backward position to the forward position of the chassis 3 into engagement with the protrusions 1a of the drive unit 1. Therefore, in the case where the disc player is installed longitudinally (the disc D is carried in a vertical direction), the empty weight of the drive unit 1 acts, in the locked state, in a direction for urging the protrusion 1a toward the engaging groove 18d of the slide member 18, that is, in a direction for enhancing the locking force. This prevents the inferior operation in which the locked state is easily and erroneously released by the external vibrations or the like.

The present invention is carried out in the mode as described above, and exhibits the effects as noted below.

The drive pin of the roller bracket puts the tracing cam portion in the arm member and the slide member to cause both the cam portions to communicate each other when the drive unit is locked, and when both the cam portions are away from each other when the drive unit is unlocked, a part of the full length required in the cam portions is borne by the slide member. Therefore, this allows miniaturization of the arm member itself and its rotating area, and the entire disc player can be formed in a thinner configuration. Further, when the drive unit is locked, the drive pin engages with the cam portion on the slide member side, thus enhancing the locking force.

Further, if it is designed so that when the drive unit moves from the unlocked state to the locked state, the slide member moves from the backward position to the forward position of the chassis with respect to the drive unit, in the case where the disc player is installed longitudinally, the empty weight of the drive unit acts to enhance the locking force when locked, preventing the inferior operation in which the locked state is easily and erroneously released by external vibrations or the like.

What is claimed is:

1. A disc player comprising: a drive unit movably supported on a chassis through a resilient member, a drive roller for carrying a disc in and out of the drive unit, a roller bracket for rotatably supporting the drive roller, an arm member rotated by the roller bracket, and a slide member being moved in a longitudinal direction of the chassis by the arm member and having a locking portion for impeding the movement of the drive unit, wherein the arm member and the slide member are respectively provided with a cam portion, an engaging portion provided on the roller bracket is arranged movably in the cam portion, and when the movement of the drive unit is impeded, both the cam portions communicate with each other and the engaging portion is positioned on one of the arm member and the slide member, whereas when the drive unit can be moved, both the cam portions are separated from each other and the engaging portion is positioned on the other of the arm member and the slide member.

2. The disc player according to claim 1, wherein said arm member is rotatably supported on said chassis, said arm member being provided with a connecting pin for connecting the former to said slide member, and when said arm member is rotated by said roller bracket, said connecting pin causes said slide member to slide.

3. The disc player according to claim 1, wherein said roller bracket is moved by a drive plate which is moved upon reception of a driving force from a driving source.

4. The disc player according to claim 1, wherein a protrusion is provided in the vicinity of an open end of the cam portion provided on said arm member, said protrusion being moved into said slide member.

5. The disc player according to claim 1, wherein when said drive unit is impeded from movement, said engaging portion is positioned at the cam portion of said slide member, and when said drive unit is movable, said engaging portion is positioned at the cam portion of said arm member.

6. In a disc player for vehicles comprising: a drive unit movably supported on a chassis through a resilient member, a drive roller for carrying a disc in and out of the drive unit, a rotatable roller bracket for moving said drive roller away from the disc when the disc is mounted, an arm member rotated by the rotation of a drive pin provided on the roller bracket, and a slide member being moved in a longitudinal direction of said chassis in association with the rotation of the arm member, wherein when said slide member is engaged with said drive unit, movement of said drive unit is impeded to assume a locked state whereas when engagement between said slide member and said drive unit is released, an unlocked state is assumed where said drive unit is movable, a locking mechanism for a disc player characterized in that said arm member and said slide member are respectively provided with a cam portion, and when said drive unit is in a locked state, both said cam portions are brought into communication with each other and said drive pin is brought into engagement with the cam portion on said slide member side whereas when said drive unit is in an unlocked state, both said cam portions are separated from each other and said drive pin is brought into engagement with the cam portion on said arm member side.

7. The locking mechanism for a disc player according to claim 6, wherein when said drive unit shifts from an unlocked state to a locked state, said slide member moves from a backward position to a forward position of said chassis relative to said drive unit.

8. The locking mechanism for a disc player according to claim 6, wherein said arm member is rotatably supported on said chassis, said arm member being provided with a connecting pin for connecting the former to said slide member, and when said arm member is rotated by said roller bracket, said connecting pin causes said slide member to slide.

9. The locking mechanism for a disc player according to claim 6, wherein said roller bracket is moved by a drive plate which is moved upon reception of a driving force from a driving source.

10. The locking mechanism for a disc player according to claim 6, wherein a protrusion is provided in the vicinity of an open end of the cam portion provided on said arm member, said protrusion being moved into said slide member.

* * * * *